United States Patent
Kendrick

(10) Patent No.: US 9,709,119 B2
(45) Date of Patent: Jul. 18, 2017

(54) COMPLIANCE COMPENSATOR

(71) Applicant: ATI Industrial Automation, Inc., Apex, NC (US)

(72) Inventor: Baron Kendrick, Apex, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 12 days.

(21) Appl. No.: 14/824,151

(22) Filed: Aug. 12, 2015

(65) Prior Publication Data
US 2017/0045106 A1 Feb. 16, 2017

(51) Int. Cl.
B23P 19/00 (2006.01)
B25J 17/02 (2006.01)
F16F 3/04 (2006.01)
F16F 13/00 (2006.01)
B25J 11/00 (2006.01)

(52) U.S. Cl.
CPC ............... F16F 3/04 (2013.01); B25J 11/00 (2013.01); F16F 13/007 (2013.01)

(58) Field of Classification Search
USPC ..... 267/160; 269/43; 33/429, 476, 520, 644, 33/645; 403/229; 700/254; 74/471 XY; 901/27, 28, 29, 45
See application file for complete search history.

(56) References Cited

U.S. PATENT DOCUMENTS

| | | | | |
|---|---|---|---|---|
| 3,824,674 A * | 7/1974 | Inoyama | ............... | B23P 19/105 29/281.4 |
| 4,179,783 A * | 12/1979 | Inoyama | ............... | B23P 19/102 29/281.5 |
| 4,202,107 A * | 5/1980 | Watson | ............... | G01B 5/25 33/644 |
| 4,332,066 A * | 6/1982 | Hailey | ............... | B23B 31/08 29/26 R |
| 4,600,228 A * | 7/1986 | Tarbuck | ............... | B65G 47/91 228/5.5 |
| 4,720,923 A * | 1/1988 | Quinton | ............... | B23P 19/102 33/520 |
| 4,737,048 A * | 4/1988 | Herrstrom | ............... | E01F 9/627 40/608 |
| 4,816,732 A * | 3/1989 | Wilson | ............... | H01L 21/68707 318/568.21 |
| 4,830,565 A * | 5/1989 | Bucher | ............... | B25J 15/103 294/115 |
| 4,872,718 A * | 10/1989 | Nerger | ............... | B25J 17/0208 294/86.4 |
| 5,148,610 A * | 9/1992 | Cusack | ............... | B25J 17/0208 33/520 |

(Continued)

Primary Examiner — Gregory Adams
(74) Attorney, Agent, or Firm — Coats & Bennett, PLLC

(57) ABSTRACT

A compliance compensator apparatus provides a mechanically compliant coupling between, e.g., a robot arm or robotic tool and a mechanical load. The compliance compensator apparatus comprise a base component and a compliance component attached to the base component and independently moveable in several aspects. The compliance component may move, with respect to the base component, axially, transversely, rotationally, and skew, in response to mechanical force from an engaged load. When the load is disengaged, the compliance compensator apparatus returns to a reset position wherein the compliance component is spaced apart from, but parallel to, the base component.

8 Claims, 8 Drawing Sheets

(56) References Cited

U.S. PATENT DOCUMENTS

| | | | | |
|---|---|---|---|---|
| 5,271,686 A | * | 12/1993 | Herring, Jr. | B21J 15/10 |
| | | | | 403/229 |
| 5,352,086 A | * | 10/1994 | Mank | B65H 3/0883 |
| | | | | 271/91 |
| 5,420,489 A | * | 5/1995 | Hansen | B25J 17/0208 |
| | | | | 318/568.1 |
| 6,408,531 B1 | * | 6/2002 | Schimmels | B25H 7/02 |
| | | | | 33/429 |
| 6,792,689 B2 | * | 9/2004 | Joo | B25J 17/0208 |
| | | | | 33/520 |
| 8,070,201 B2 | * | 12/2011 | Trygg | B25J 15/0052 |
| | | | | 294/86.4 |
| 2011/0113622 A1 | * | 5/2011 | Liu | B25J 15/0616 |
| | | | | 29/762 |

\* cited by examiner

COMPLIANCE COMPENSATOR

FIELD OF INVENTION

The present invention relates generally to mechanical couplings, and in particular to a variable-stiffness compliance compensator apparatus operative to comply under the mechanical force of a load in any combination of axial, rotational, translational, and skew aspects.

BACKGROUND

With the increasing use of robotics and other automation, more and more mechanical fabrication and assembly operations are performed by machines. In many cases, some degree of compliance is necessary or desirable in preforming many machine tasks.

As one simple example, consider the task of applying a label to a workpiece. A label is positioned on a mechanical extender, such as a tool attached to a robotic arm, such that an adhesive surface is facing outwardly, and a workpiece is positioned in front of it. The arm then simply extends until it makes contact with the workpiece, and the label adheres to the workpiece. However, if the workpiece facing surface is not precisely aligned with a plane normal to the axial direction of the arm extension—that is, if the workpiece surface is skew to plane of the label—only an edge, or even just a corner, of the label will be pressed against the workpiece surface. If, on the other hand, the tool applying the label has even a slight degree of skew compliance, a uniform force will be applied over the entire surface of the label, even if the facing surface of the workpiece is not perfectly perpendicular to the axis of motion of the arm.

In general, mechanical loads may require compliance in numerous aspects, such as skew (two planes not perfectly parallel), axial (along the line of motion), transverse (perpendicular to the line of motion), rotational, or more generally, some combination of these. Prior art mechanical tools and couplings conventionally do not allow for mechanical compliance, or are compliant only in one aspect. Furthermore, prior art tools and couplings that do provide for mechanical compliance, such as via springs and the like, have only one "stiffness," and cannot adapt to the different levels of compliance force that are encountered in various robotic applications.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments disclosed and claimed herein, a compliance compensator apparatus provides a mechanically compliant coupling between, e.g., a robot arm (or a tool attached thereto) and a workpiece, more generally referred to herein as a load. The compliance compensator apparatus comprise a base component attachable to the robot arm and a compliance component attached to the base component and independently moveable, to at least some degree, in several aspects. The compliance component may move, with respect to the base component, axially, transversely, rotationally, and skew, in response to mechanical force from an engaged load. When the load is disengaged, the compliance compensator apparatus returns to a reset position wherein the compliance component is spaced apart from, but parallel to, the base component. In one embodiment, the base component includes a piston disposed in a chamber having a pneumatic port, and the stiffness of the compliance compensator apparatus may be set by varying the pneumatic pressure in the chamber behind the piston. In one embodiment, a sensor detects when the compliance compensator apparatus is not in the reset position. The piston returns the compliance component to its spaced-apart position in the reset position. Shoulder bolts affixed to the base component seat in corresponding conical surfaces of the compliance component, defining the transverse and rotational components of the reset position. The shoulder bolts are biased to seat within the conical surfaces by the piston (if present), and also under spring bias. The size of a bore through each conical surface, relative to the diameter of a shank of each shoulder bolt, determines the extent of transverse and rotational compliance.

One embodiment relates to a compliance compensator apparatus. The apparatus includes a base component operative to be connected to a robotic arm, the base component comprising a surface defining a first plane and an axis normal to the plane. The apparatus further includes a compliance component attached to the base component and moveable with respect to the base component along the axis. The compliance component comprises a surface defining a second plane. When the compliance compensator apparatus is in a reset position, the compliance component is biased to position axially spaced apart from the base component and the second plane is parallel to the first plane. The compliance component is operative to move skew with respect to the base component so as to comply with an external load, such that the second plane is not parallel to the first plane. The compliance component is operative to return to the reset position when the external load is removed.

Another embodiment relates to a method of mechanically engaging a load. A compliance compensator apparatus is provided. The compliance compensator apparatus comprises a base component comprising a surface defining a first plane and an axis normal to the plane and a compliance component attached to the base component and moveable with respect to the base component along the axis. The compliance component comprises a surface defining a second plane. A reset position of the compliance compensator apparatus is detected, via a sensor. In the reset position, the compliance component is spaced away from the base component and the first and second planes are parallel. A predetermined stiffness for the compliance compensator apparatus is set. The stiffness defines the magnitude of a mechanical force applied by a load required to cause compliance by the compliance compensator apparatus. A load is engaged, thereby causing the compliance component to move, with respect to the base component, in one or more of axial, rotational, translational, and skew aspects. After the load is disengaged, the sensor detects that the compliance compensator apparatus has returned to the reset position.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1A:
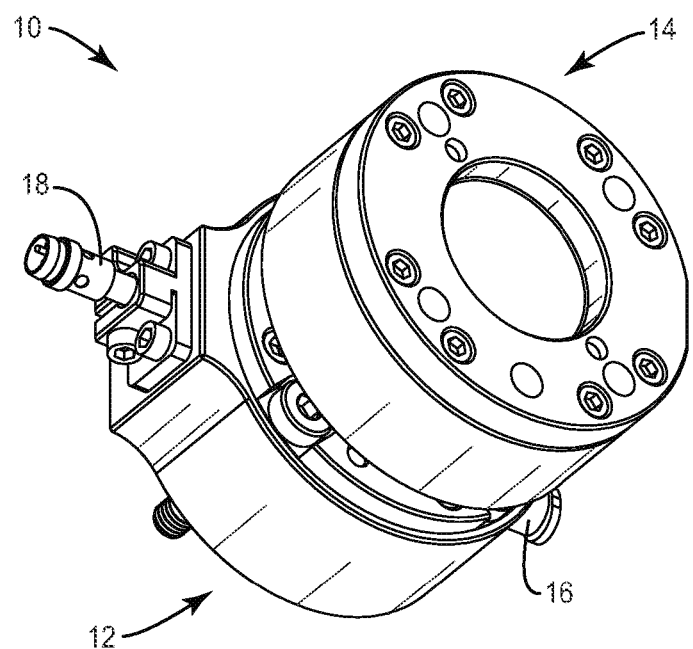
FIGS. 1A and 1B are perspective views of a compliance compensator apparatus.
Figure 1B:
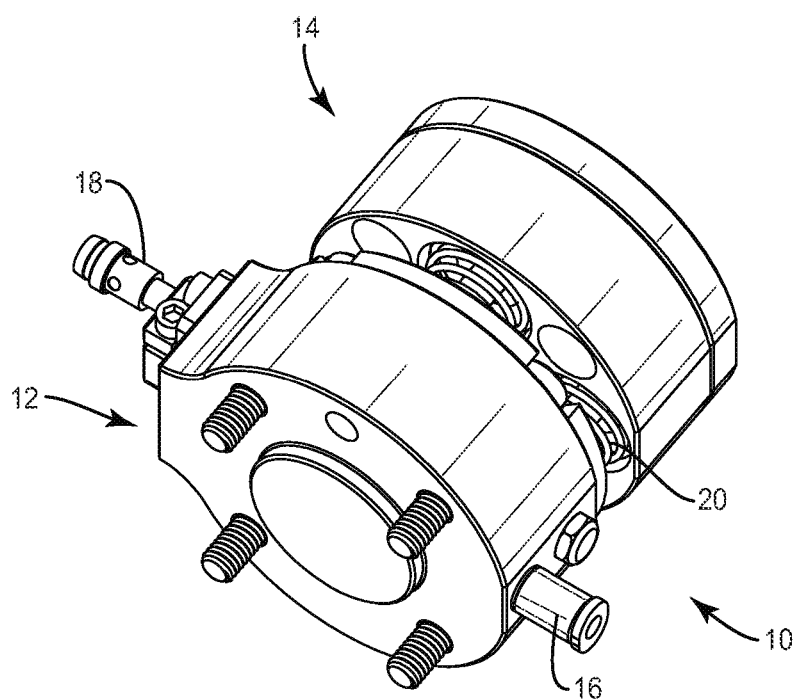

FIGS. 1A and 1B depict a compliance compensator apparatus 10. The compliance compensator apparatus 10 comprises a base component 12 operative to be connected to a robotic arm or other machinery. The compliance compensator apparatus 10 further comprises a compliance component 14 operative to connect to a tool or to perform some mechanical operation on a workpiece. In a reset position—that is, when not complying under mechanical force from a load—the compliance component 14 is co-axial with, and spaced apart from, the base component 12. Springs 20 (FIG. 1B) bias the compliance component 14 toward the reset position.

Figure 2:
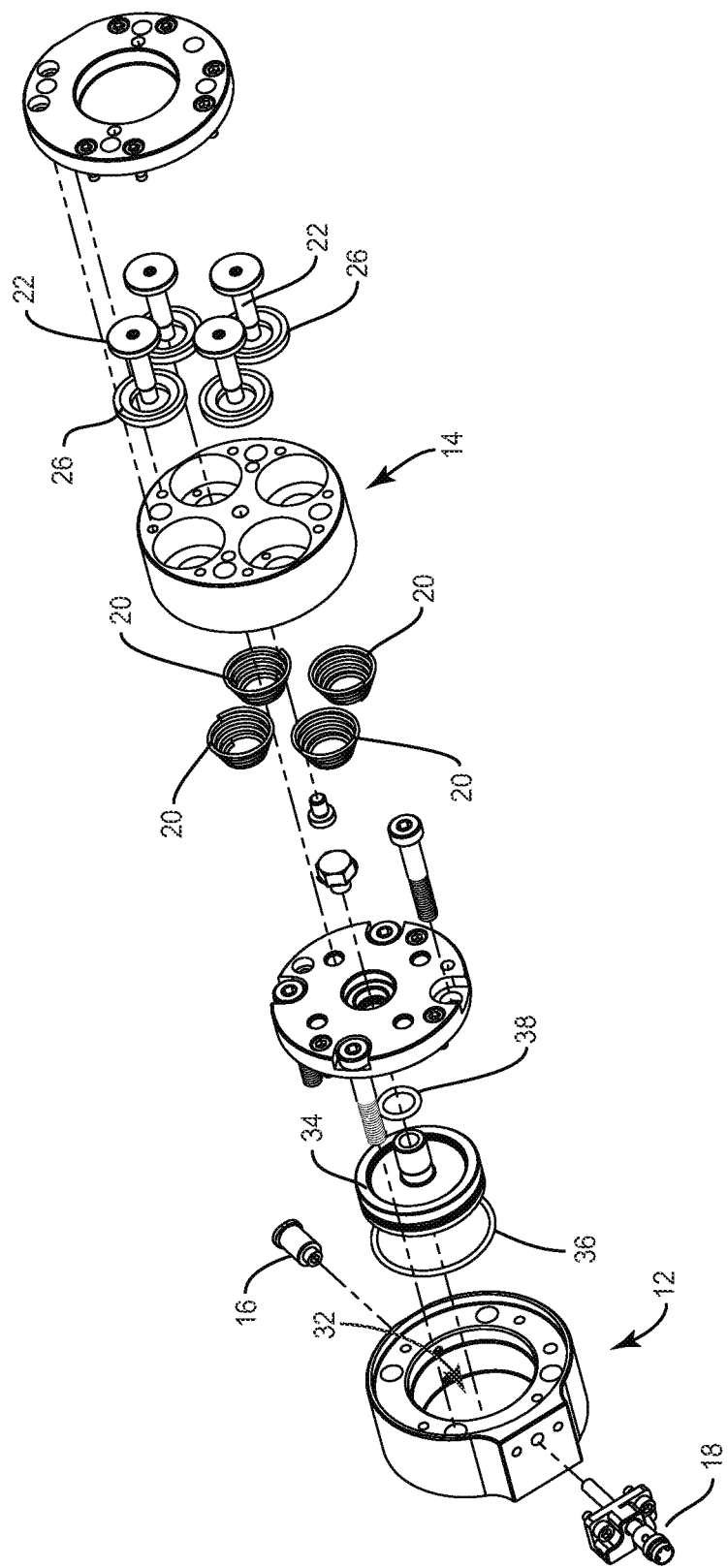
FIG. 2 is an exploded perspective view of the compliance compensator apparatus.

FIG. 2 is an exploded parts diagram, presented for general reference and to show the relationship of the various components discussed herein. Items not relevant to this discussion (fasteners, pins, and the like) are omitted for clarity.

Figure 3A:
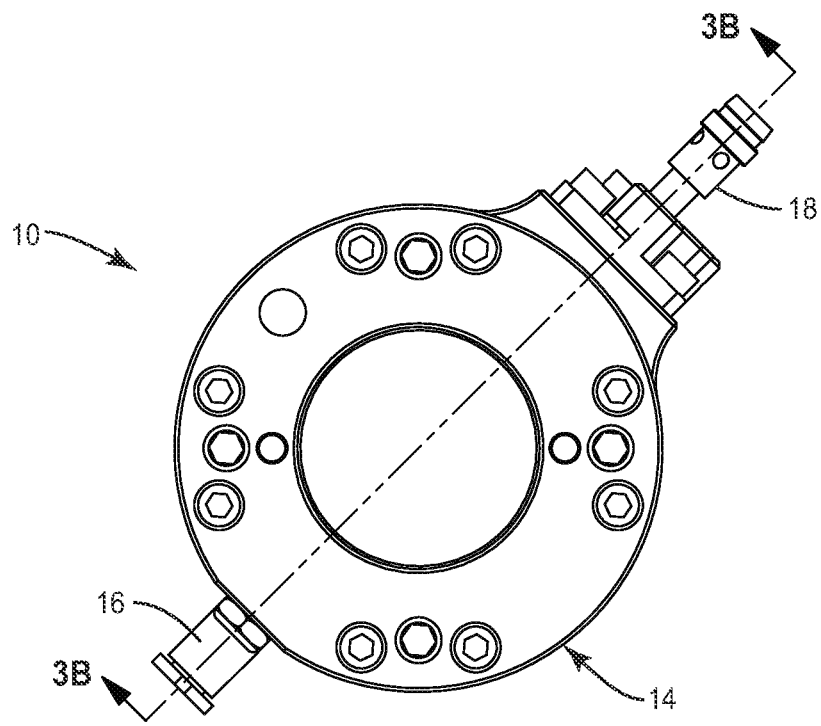
FIGS. 3A and 3B are a plan and section view of the compliance compensator apparatus in a reset position.
Figure 3B:
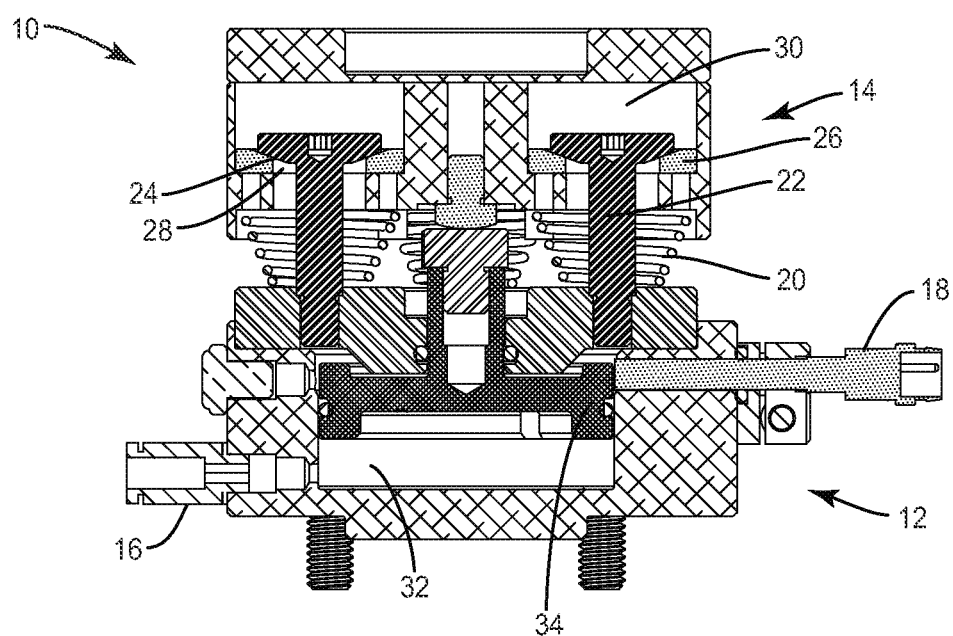

FIG. 3A is a plan view of the compliance component 14 of the compliance compensator apparatus 10, depicting a section line defining the section view of FIG. 3B. In FIGS. 3A and 3B depict the compliance compensator apparatus 10 in the reset position, with the compliance component 14 spaced apart from, axially centered on, and parallel with, the base component 12.

FIG. 3B depicts a plurality of shoulder bolts 22 affixed to the base component 12. The shoulder bolts 22 have a conical undersurface 24, which seats against a corresponding conical surface in the compliance component 14. In one embodiment, this surface is provided by a conical washer 26. A bore 28 through each conical washer 26 is larger in diameter than the shank of a corresponding shoulder bolt 22, allowing the compliance component 14 to move slightly with respect to the base component 12, under mechanical force of a load. That is, when the compliance component 14 is pressed towards the base component 12 (note the space 30 in the compliance component 14 above each shoulder bolt 22 allowing this movement), the compliance component 14 "floats" with respect to the base component 12, to the extent the shoulder bolts 22 can move within the bores 28 through the conical washers 26. The conical washers 26 within the compliance component 14 are urged against the fixed conical undersurfaces 24 of the shoulder bolts 22, at least in part, by the bias of springs 20.

The embodiment depicted includes four shoulder bolts 22, conical washers 26, and springs 20, which provides good performance and allows for robust reset positioning. Other embodiments may include more or fewer bolts 22, washers 26, and springs 20 (indeed, the number of springs 20 need not match the number of bolts 22 and washers 26). At a minimum, at least one shoulder bolt 22 and conical washer 26 are required to secure the compliance component 14 to the base component 12. Assuming the shoulder bolt 22 were centrally positioned, this configuration would have unlimited rotational compliance. However, it would provide little skew stiffness, or resistance. At least three shoulder bolts 22 and conical washers 26 provide robust reset positioning performance.

The base component 12 includes a pneumatic chamber 32, in which is disposed a piston 34. O-rings 36, 38 seal the piston 34 against the chamber 32 walls. The piston 34 is operative to move axially within the chamber, between a retracted position depicted in FIG. 4B, (in a condition of full axial compliance) and an extended position depicted in FIG. 3B, when the compliance compensator apparatus 10 is in a reset position. A pneumatic port 16 controls the pneumatic pressure in the chamber 32. By varying this pneumatic pressure, the stiffness of the compliance compensator apparatus 10 may be adjusted. For example, in one embodiment the pneumatic pressure may vary between 0 psi and 100 psi. At 0 psi, all of the stiffness of the compliance compensator apparatus 10 is provided by the springs 20 biasing the compliance component 14 away from the base component 12. As the pneumatic pressure in the chamber 32 is increased, the compliance component 14 resists moving from the reset position with increasing force—that is, a greater mechanical force by the load is required to achieve compliance.

A sensor 18 is disposed in the base component 12 in a position operative to detect the piston 34 when it is fully extended—that is, in the reset position (or only slightly in compliance away from the reset position). As the piston 34 retracts within the chamber 32 (under axial compliance), the sensor no longer detects the presence of the piston, and relays this information to a control system (not shown).

As mentioned above, FIG. 3B depicts the compliance compensator apparatus 10 in the reset position. The apparatus 10 will assume this position whenever there is no mechanical force exerted on it by a load. In the reset position, the compliance component 14 is biased away from the base component 12, by both the springs 20 and the piston 34 (if the chamber 32 is pressurized). In the reset position, the seating of the shoulder bolts 22 in the conical washers 26 position the compliance component 14 such that it is axially centered and with zero rotation with respect to the base component 12. Additionally, the plane of the upper surface of the compliance component 14 is parallel with the plane of the base of the base component 12. The sensor 18 detects the presence of the piston 34, and may relay this information to a control system (not shown). In this position, the pneumatic pressure in the chamber 32 may be adjusted to provide a predetermined stiffness for an anticipated compliance operation when a load is engaged.

Figure 4A:
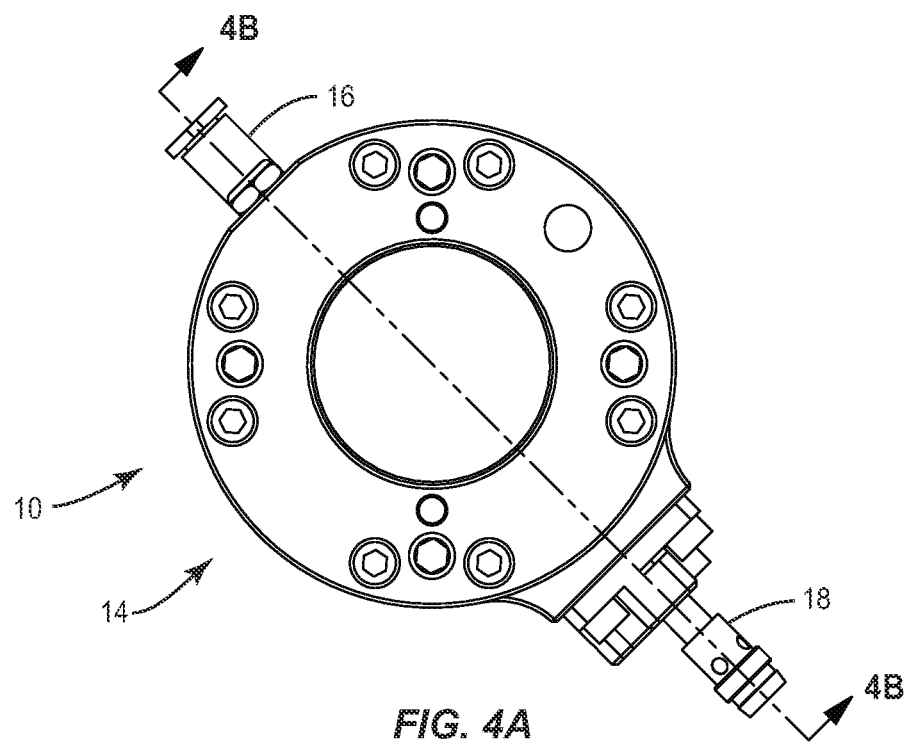
FIGS. 4A and 4B are a plan and section view of the compliance compensator apparatus in a position of full axial compliance.
Figure 4B:
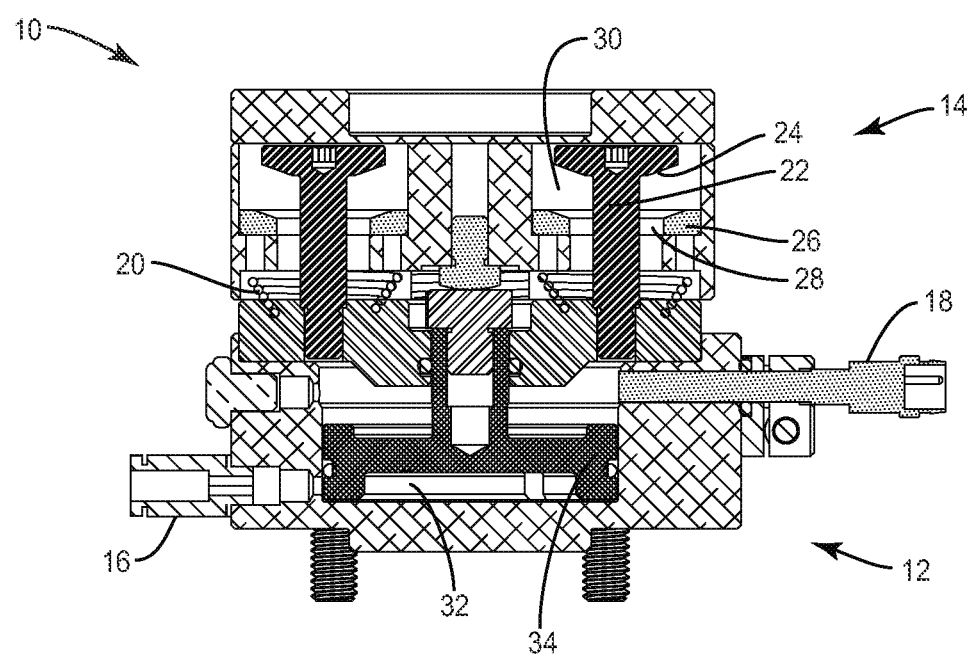

FIG. 4A is a plan view of the compliance component 14 of the compliance compensator apparatus 10, depicting a section line defining the section view of FIG. 4B. FIGS. 4A and 4B depict the compliance compensator apparatus 10 in full axial compliance, with the compliance component 14 pressed against the base component 12 by a load (not shown). In the full axial compliance position, the springs 20 are fully compressed, and the conical undersurfaces 24 of the shoulder bolts 22 are disengaged from the corresponding conical surfaces of the conical washers 26. Note that the heads of the shoulder bolts 22 fill the space 30 within the compliance component 14. In this position, the piston 34 is in the fully retracted position, against the pneumatic pressure in the chamber 32. The sensor 18 does not detect the presence of the piston 34, and may relay this information to a control system (not shown). In this depiction, the compliance compensator apparatus 10 in full axial compliance; however, the compliance component 14 remains axially aligned with the base component 12. The shoulder bolts 22 remain centered within the bores 28 of the corresponding conical washers 26.

Figure 5A:
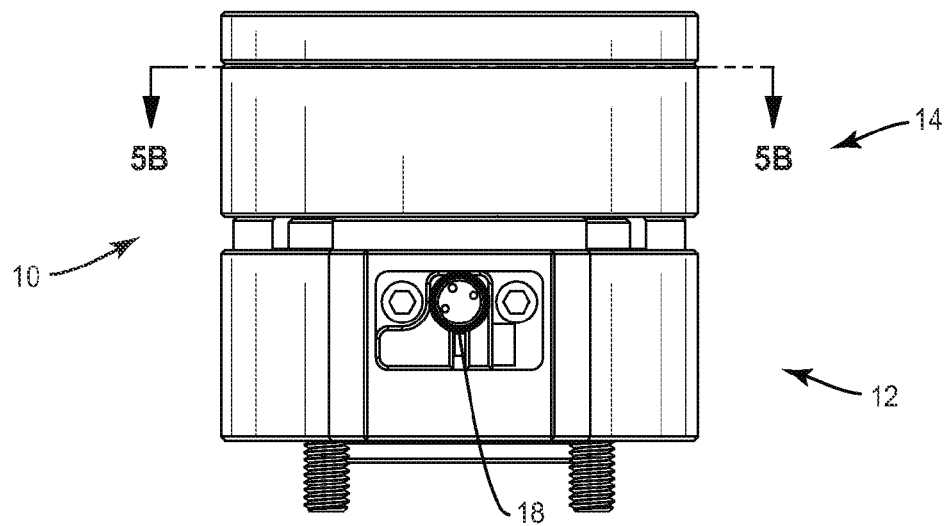
FIGS. 5A and 5B are an elevation and section view of the compliance compensator apparatus in a position of full rotational compliance.
Figure 5B:
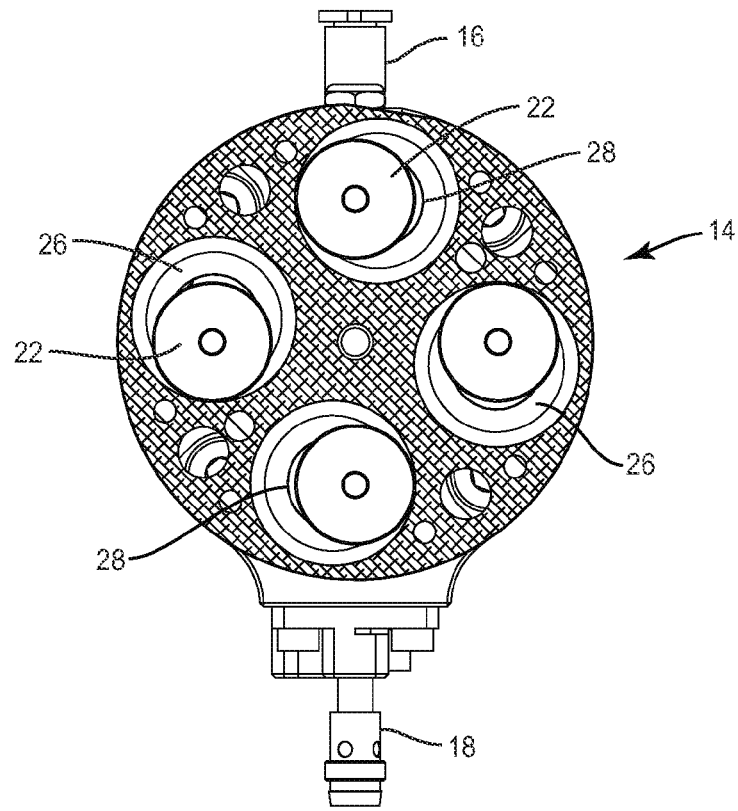

FIG. 5A is an elevation view of the compliance compensator apparatus 10, depicting a section line defining the section view of FIG. 5B. FIGS. 5A and 5B depict the compliance compensator apparatus 10 in full axial and additionally full rotational compliance. As depicted in FIG. 5B, the conical undersurfaces 24 of the shoulder bolts 22 are disengaged from the corresponding conical surfaces of the conical washers 26. Additionally, the compliance component 14, and hence the conical washers 26, are rotated with respect to the base component 12, and hence the shoulder bolts 22. A portion of the bore 28 can be seen to one side of each of the shoulder bolts 22—to the right of the upper bolt 22, above the bolt 22 to the left, and so on, showing that the compliance component 14 has rotated slightly clockwise, as depicted in FIG. 5B, with respect to the base component 12. The extent of allowed rotation is determined by the excess of bore 28 diameter over bolt 22 shank diameter.

Figure 6A:
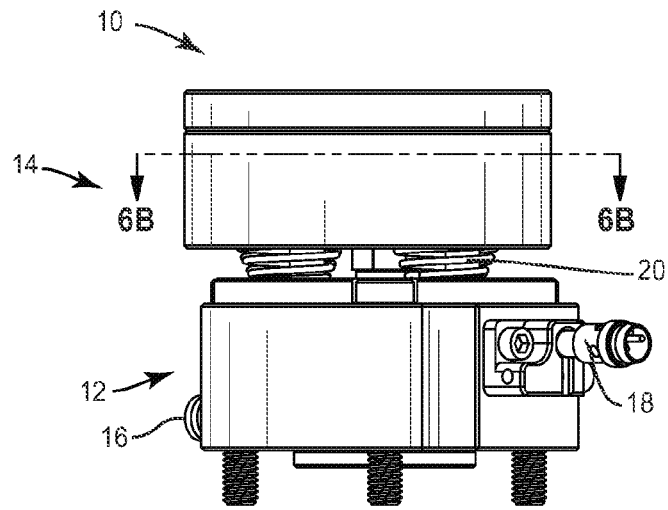
FIGS. 6A, 6B, and 6C are elevation and section views of the compliance compensator apparatus in a position of full transverse compliance.
Figure 6B:
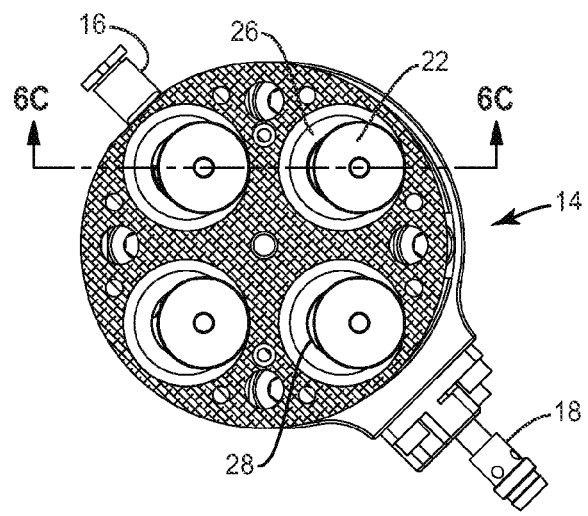
Figure 6C:
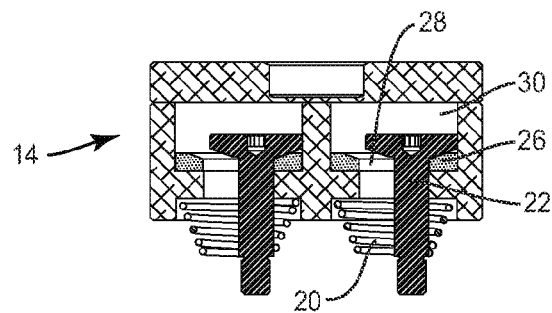

FIG. 6A is an elevation view of the compliance compensator apparatus 10, depicting a section line defining the section view of FIG. 6B, which itself includes a section line defining the section view of FIG. 6C. FIGS. 6A, 6B, and 6C depict the compliance compensator apparatus 10 in partial axial and additionally full translational compliance (also referred to herein as transverse compliance). As depicted in FIG. 6A, the compliance component 14 is translated to the left, with respect to the base component 12—that is, the two components 12, 14 are not axially aligned. However, the compliance component 14 remains parallel to the base component 12.

FIG. 6B depicts a sectional view showing the shoulder bolts 22 positioned against the right sides of the bores 28 of their respective conical washers 26, with the left side of each bore 28 just visible. FIG. 6C depicts a section view showing the compliance component 14 displaced to the left of the shoulder bolts 22. Each space 30 within the compliance component 14 that houses the head of a shoulder bolt 22 is sized such that the edge of the bolt head just touches an inner wall of the space 30 when the compliance component 14 is in maximum transverse compliance. In this case, the compliance component 14 is in axial compliance only to the extent necessary for the conical undersides 24 of the shoulder bolts 22 to unseat from their respective conical washers 26. Of course, the translational compliance can be in any direction lying on the plane of the surface of the compliance component 14, and the extent of the compliance is determined by the excess of bore 28 diameter over bolt 22 shank diameter.

Figure 7A:
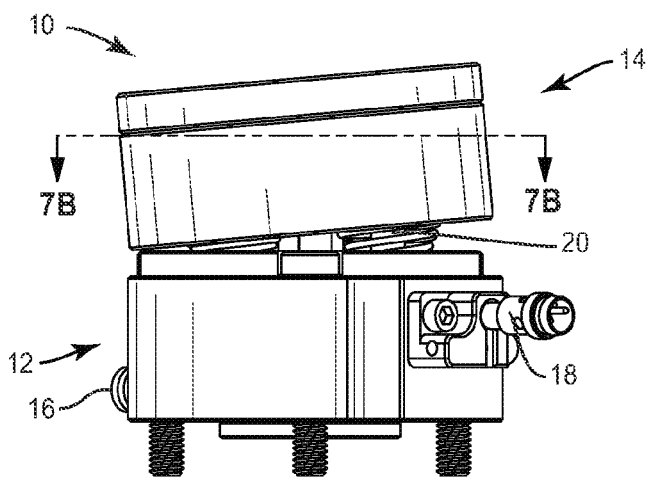
FIGS. 7A, 7B, and 7C are elevation and section views of the compliance compensator apparatus in a position of skew compliance.

FIG. 7A is an elevation view of the compliance compensator apparatus 10 in skew compliance, wherein a plane defined by a surface of the compliance component 14, e.g., the upper surface, is not parallel with a plane defined by a surface of the base component 12, e.g., the lower surface. Such compliance may find utility in the label-applying application discussed in the Background section of this disclosure. FIG. 7A depicts a section line defining the section view of FIG. 7B, which itself includes a section line defining the section view of FIG. 7C.

Figure 7B:
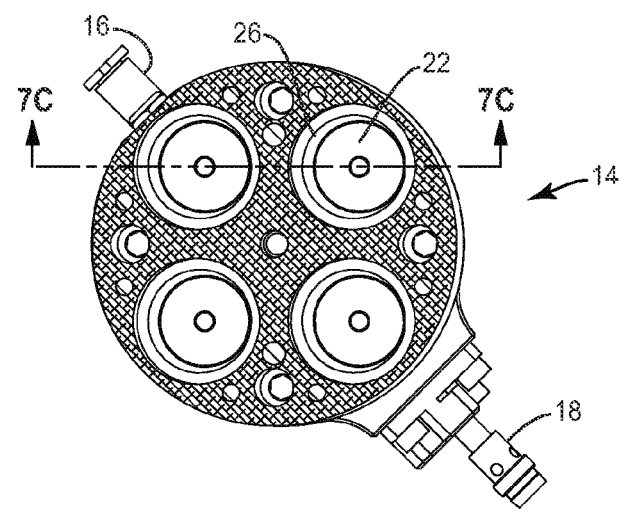
Figure 7C:
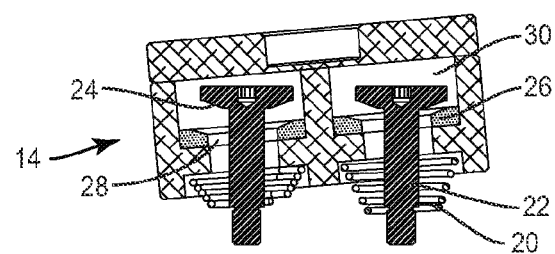

FIG. 7C depicts the conical undersurfaces 24 of the shoulder bolts 22 displaced from the conical washers 26, to different degrees. Note that one spring 20 is compressed to a greater extent than the other. FIGS. 7A-7C show that the compliance component 14 may comply in a skew aspect with respect to the base component 12 in any direction. The degree of compliance in this case is not necessarily determined by the relationship between bore 28 and shoulder bolt 22 shank dimensions, but rather may be determined by compliance component 14 size and geometry.

Although the compliance compensator apparatus 10 has been depicted and described herein undergoing different aspects of compliance separately—e.g., axial (FIGS. 4A-4B), rotational (FIGS. 5A-5B), translational (FIGS. 6A-6C), and skew (FIGS. 7A-7C), in practice, the apparatus 10 may exhibit various combinations of these compliance aspects. For example, all rotational and translational compliance actions will require at least a slight degree of axial compliance, as the shoulder bolt 22 heads unseat from the conical washers 26. As another example, a skew compliance may be combined with a rotational, translational, and/or significant axial compliance. In general, the compliance component 14 may freely "float" over the base component 12, within mechanical limits. In this manner, the compliance compensator apparatus 10 will accommodate slight positioning and/or alignment irregularities as they occur in the real world. The separation of compliance actions into discrete axial, rotational, translational, and skew aspects is simply an analytical and pedagogical tool.

Figure 8:
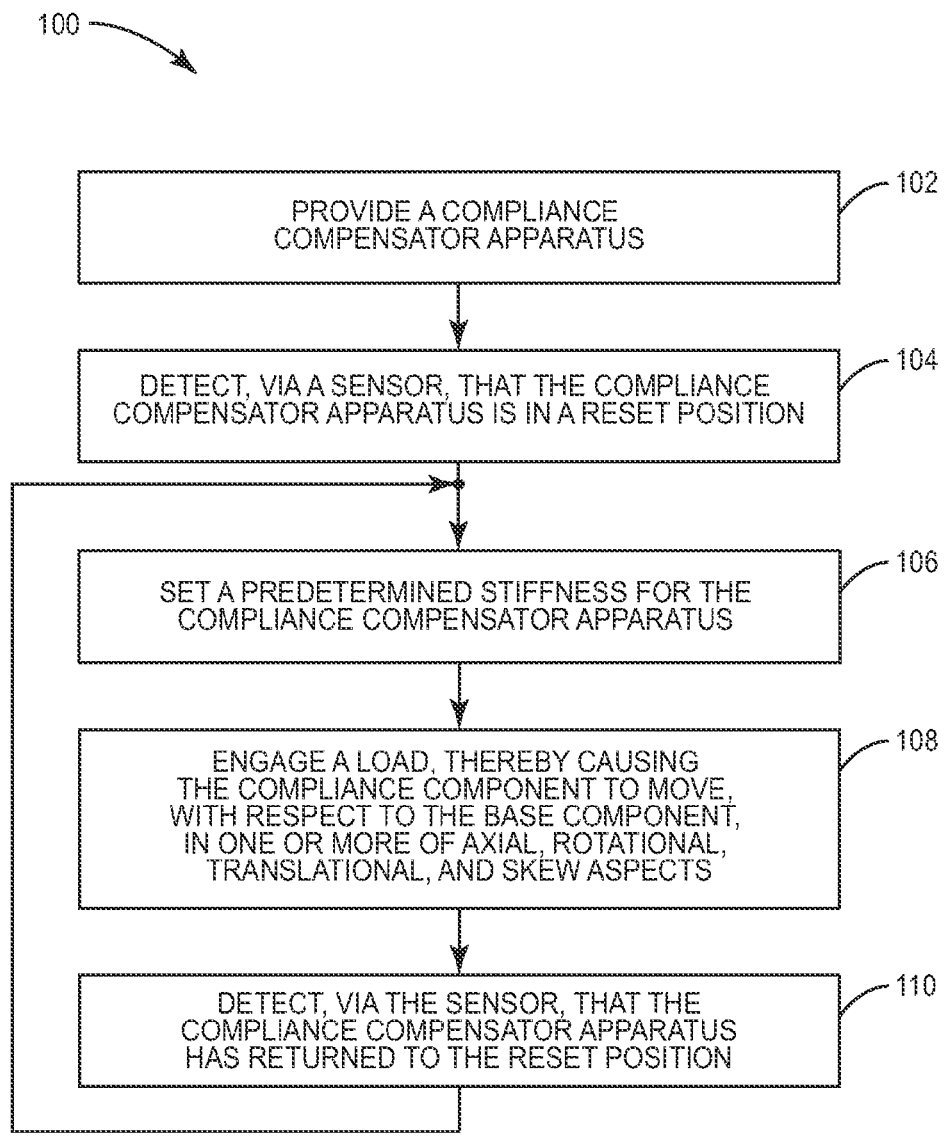
FIG. 8 is a flow diagram of a method of engaging a mechanical load.

FIG. 8 depicts a method 100 of mechanically engaging a load, such as by a robot arm. A compliance compensator apparatus 10 is provided, and affixed to the robot arm (block 102). The compliance compensator apparatus 10 comprises a base component 12 comprising a surface defining a first plane and an axis normal to the plane, and a compliance component 14 attached to the base component 12 and moveable with respect to the base component 12 along the axis. The compliance component 14 comprises a surface defining a second plane.

The method 100 further comprises detecting, via a sensor 18, that the compliance compensator apparatus 10 is in a reset position (block 104). In the reset position, the compliance component 14 is spaced away from the base component 12 and the first and second planes are parallel. In one embodiment, the sensor 18 is positioned so as to detect the proximity of a piston 34 when the piston 34 is in a fully extended position within a chamber 32 in the base component 12.

A predetermined stiffness is set for the compliance compensator apparatus 10 (block 106). The stiffness defines the magnitude of a mechanical force applied by a load which is required to cause compliance by the compliance compensator apparatus 10. The stiffness may be set, for example, by controlling the pneumatic pressure in the chamber 32 behind the piston 34 in the base component 14.

A load is engaged (block 108). Mechanical force exerted by the load (or by the robot arm against the load) causes the compliance component 14 to move, with respect to the base component 12, in one or more of axial, rotational, translational, and skew aspects.

After the mechanical engagement with the load, the method 100 comprises detecting, via the sensor 18, that the compliance compensator apparatus 10 has returned to the reset position. In one embodiment, this may comprise detecting the presence of the piston 34 in the fully extended position. The system is then ready to engage another load, which may require a different stiffness of compliance (block 106).

Embodiments of the present invention present numerous advantages over mechanical couplings of the prior art. Complex compliance movements may comprise any combination, within the limits of motion of a particular embodiment, of axial, rotational, translational, and skew aspects. In general, the compliance component 14 may "float" freely over the base component 12, within mechanical limits, to account for slight irregularities in positioning and alignment between, e.g., a robot arm and a load or workpiece. The stiffness of the compliance compensator apparatus 10 may be set to a predetermined level by adjusting the pneumatic pressure in the chamber 32. This allows the same compliance compensator apparatus 10 to be used with loads of a wide variety of sizes and weights.

Although only one embodiment is depicted and described herein in detail, this is to elucidate features of the invention, and is not limiting. Those of skill in the art may fashion a compliance compensator apparatus 10 having, e.g., any number of shoulder bolts 22, as required for a particular implementation. Where variable stiffness is not required or desired, the piston 34 may be omitted, and the compliance compensator apparatus 10 stiffness determined solely by the force of springs 20. Where automation is not required or desired, the sensor 18 may be omitted; alternatively, where greater control is desired, additional sensors 18 may be disposed to detect and monitor the degree of compliance. Such variations are well within the skill of those of ordinary skill in the art, given the teachings of this disclosure.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A compliance compensator apparatus, comprising:
   a base component comprising a surface defining a first plane and an axis normal to the plane;
   a compliance component attached to the base component and moveable with respect to the base component along the axis and rotationally about the axis, the compliance component comprising a surface defining a second plane;
   one or more shoulder bolts affixed to the base component and extending into a corresponding space in the compliance component and operative to seat in a corresponding conical surface in the compliance component;
   whereas when the compliance compensator apparatus is in a reset position, the compliance component is biased, by a bias spring corresponding to each shoulder bolt and urging the shoulder bolt to seat in the corresponding conical surface, to a position axially spaced apart from the base component and the second plane is parallel to the first plane;
   whereas the compliance component is operative to move skew and/or rotationally with respect to the base component so as to comply with an external load, such that the second plane is not parallel to the first plane, wherein the degree of skew compliance is at least partially limited by the relative size and position of a shoulder bolt and corresponding space, and the degree of rotational compliance is at least partially limited by a difference between each shoulder bolt shank diameter and a diameter of a bore through the corresponding conical surface; and
   whereas the compliance component is operative to return to the reset position when the external load is removed.

2. The apparatus of claim 1 wherein the compliance component is further operative to move axially towards the base component so as to comply with an external load.

3. The apparatus of claim 1 wherein the compliance component is further operative to translate with respect to the base component up to a predetermined amount in any direction lying on the second plane, so as to comply with an external load.

4. The apparatus of claim 1 further comprising:
   a chamber in the base component;
   a pneumatic port in pneumatic fluid flow relationship with the chamber; and
   a piston disposed in the chamber and moveable axially between retracted and extended positions, wherein pneumatic fluid injected into the chamber is operative to exert an axial force biasing the piston toward the extended position.

5. The apparatus of claim 4 wherein the piston is operative to bias the compliance component away from the base component with a variable force that depends on the pneumatic pressure in the chamber.

6. The apparatus of claim 5 further comprising a sensor located such that it detects proximity to the piston when the piston is in the extended position, does not detect proximity when the piston is in the retracted position.

7. A method of mechanically engaging a load, comprising:
   providing a compliance compensator apparatus comprising a base component comprising a surface defining a first plane and an axis normal to the plane, the base component further including a piston moveable along the axis within a chamber, and further providing a compliance component attached to the base component and moveable with respect to the base component along the axis, the compliance component comprising a surface defining a second plane;
   detecting, via a sensor, that the compliance compensator apparatus is in a reset position, wherein the compliance component is spaced away from the base component and wherein the first and second planes are parallel, by sensing the position of the piston within the chamber;
   setting a predetermined stiffness for the compliance compensator apparatus defining the magnitude of a mechanical force applied by a load required to cause compliance by the compliance compensator apparatus, by adjusting a force opposing movement of the piston within the chamber;

engaging a load, thereby causing the compliance component to move, with respect to the base component, in one or more of axial, rotational, translational, and skew aspects; and detecting, via the sensor, that the compliance compensator apparatus has returned to the reset position, by sensing the position of the piston within the chamber.

8. The method of claim 7 wherein detecting, via a sensor, that the compliance compensator apparatus is in a reset position comprises receiving a signal from a sensor located proximate to an extended position of the piston in the compliance compensator apparatus, and further comprising detecting, via the sensor, that the compliance compensator apparatus is in axial compliance by not receiving a signal from the sensor.

* * * * *